United States Patent [19]

Lambert et al.

[11] 4,011,356

[45] Mar. 8, 1977

[54] LAMINATED GLAZING PANE

[75] Inventors: Emmanuel Lambert, Jumet; Lucien Leger, Montigny-le-Tilleul, both of Belgium

[73] Assignee: Glaverbel-Mecaniver S.A., Watermael-Boitsfort, Belgium

[22] Filed: Dec. 19, 1974

[21] Appl. No.: 534,218

[30] Foreign Application Priority Data

Jan. 29, 1974 United Kingdom ............... 4109/74
Jan. 29, 1974 United Kingdom ............... 4111/74

[52] U.S. Cl. .................................. 428/34; 52/616; 181/33 G; 428/213; 428/437; 428/442

[51] Int. Cl.² ...................... E06B 3/24; E04B 1/82; B32B 17/10

[58] Field of Search ............... 52/616; 428/34, 339, 428/437, 442, 213, 214, 215, 216, 426; 181/33 G

[56] References Cited

UNITED STATES PATENTS

| | | | |
|---|---|---|---|
| 2,239,527 | 4/1941 | Kamerer | 428/214 |
| 2,946,711 | 7/1960 | Bragaw, Jr. et al. | 428/437 |
| 3,231,461 | 1/1966 | Mattimoe | 181/33 G |
| 3,249,178 | 5/1966 | Watters | 428/442 |
| 3,262,835 | 7/1966 | Longmeadow et al. | 428/437 |
| 3,262,836 | 7/1966 | Longmeadow et al. | 428/437 |
| 3,734,815 | 5/1973 | Schorel | 428/437 X |
| 3,783,084 | 1/1974 | Quenett | 428/437 X |
| 3,799,817 | 3/1974 | Van Laethem | 428/442 X |

*Primary Examiner*—William J. Van Balen
*Attorney, Agent, or Firm*—Spencer & Kaye

[57] ABSTRACT

A laminated glazing pane comprised of at least two sheets of vitreous material joined together by an intervening layer of plastic material given improved sound attenuation properties by constructing the pane in such a manner that its base frequency ($f$) is between 0.70 and 0.97 times its theoretical base frequency ($f_0$).

19 Claims, 4 Drawing Figures

LAMINATED GLAZING PANE

BACKGROUND OF THE INVENTION

This invention relates to a laminated glazing pane composed of two or more sheets of vitreous material, with successive facing surfaces of the sheets being bonded together via an intervening layer of adhesive material. The invention is particularly directed to the acoustic properties of such panes.

The use of large areas of windows and other panels such as glazed partitions which is a feature of modern architectural practice, gives rise to the problem of achieving comfortable sound levels in rooms whose walls are constituted by the panels, especially in noisy environments. The problem is particularly acute in the case of windows which face busy roads or which are near airports, and glazing panels having good sound insulating properties are required for use in these situations, and also to form interior partitions such as in recording and broadcasting studios.

A pane formed by a single sheet of glass, such as an ordinary plate glass window, gives rise to a transmission loss, i.e. sound reduction, whose extent depends on the dimensions of the sheet and the frequency of the incident sound. For a given sheet, the transmission loss will be greater for higher sound frequencies within a certain sound frequency range; for a given frequency of sound within that range incident on a sheet of given length and breadth, the transmission loss will increase with increase in the thickness of the sheet.

Thus, in order to increase the sound insulating effectiveness of a sheet, it would seem that it is only necessary to increase the thickness of the sheet.

Increasing the thickness of the sheet however also has an effect on the extent of the frequency range referred to.

This range is bounded at its lower end by the frequency of sound vibration which corresponds with the fundamental resonance frequency of the sheet. A substantial decrease in transmission loss takes place at or about the resonance frequency.

It has been calculated that the fundamental resonance frequency of a sheet of given length and breadth is directly proportional to the thickness of the sheet.

Above the resonance frequency zone, transmission loss at a given sheet increases with the frequency of the incident sound as above described, until a frequency is reached which gives rise to the so-called 'co-incidence effect'. The frequency of sound waves giving rise to the co-incidence effect depends, for a given sheet, upon the angle of incidence of such waves on the sheet, and corresponds to the frequency at which the projected incident wavelength on the sheet is equal to the wavelength of free bending waves in the sheet. This wavelength is the one of the elastic wave which freely propagates along the plane of the sheet assumed of infinite dimension; it depends upon the nature of the material and the thickness of the sheet. The lowest sound frequency at which co-incidence takes place, the critical frequency of co-incidence, is that corresponding to a sound wavelength equal to the wavelength of free bending waves in the sheet, when the angle of incidence of the sound is 90°, i.e., grazing incidence, to known an incidence tangent to the surface of the sheet. Where the co-incidence effect obtains, the transmission loss across the sheet is reduced because of the efficient mechanical coupling existing between the sheet and the surrounding air.

This critical frequency is independent of the length and breadth of the sheet, but decreases as the thickness of the sheet is increased.

Thus it will be seen that in order to increase the sound transmission loss across a sheet, the sheet may be given an increased thickness, but such an increase in the thickness of the sheet will narrow the range of sound frequencies over which the increased sound transmission loss is obtained.

For example, considering single sheets of glass one meter square, two sheets, 6 mm and 12 mm thick, respectively, may have resonance frequencies of approximately 30 Hz and 60 Hz, respectively, and critical frequencies of co-incidence of approximately 2000 Hz and 1000 Hz, respectively.

Currently accepted theories predict that doubling the thickness of a sheet in this way gives a 6 dB increase in sound transmission loss for sound of a given frequency, but in the cases being considered, this increase in transmission loss will only be obtained over the range from 60 Hz to 1000 Hz, because in the ranges 30 Hz to 60 Hz and 1000 Hz to 2000 Hz, the advantage of doubling the sheet thickness is masked by resonance or co-incidence effects. It should be noted that the numerical values given here are based on theory and are only approximately borne out by experiment.

In order to enhance the sound insulating properties of a pane, it is known to increase the transmission loss of the pane by substituting for a single sheet, two or more thinner vitreous sheets of the same total thickness which are bonded together by means of a layer or layers of intervening adhesive material.

The transmission loss at the critical frequency for such pane will be somewhat greater than the transmission loss at the critical frequency for the thick single sheet and this will ensure improved acoustic insulation; however this improvement is usually not sufficient.

One way of increasing the transmission loss has been to increase the thickness of one such intervening layer, although this adds appreciably to the cost of the pane.

A factor which contributes to the sound insulating effectiveness of such a panel is the damping afforded by the intervening layer or layers of adhesive material. To measure this damping, applicants have devised a test for comparing the behavior of a laminated pane and a monolithic pane constituted by a single vitreous sheet when these are subjected to vibration.

The test is carried out at 20° C. In order to perform the test, the thickness of each individual vitreous sheet of the laminated pane is measured, and a monolithic vitreous pane having a thickness equal to the total measured thickness of the vitreous sheets of the laminated pane is cut to form a monolithic bar 20cm long and 2 cm wide. A laminated bar of similar size is also cut from the laminated pane, the laminations succeeding one another in the thickness direction. The monolithic bar is supported at points lying 5 cm from each of its ends, and one end is caused to vibrate at a variable frequency with substantially constant amplitude. The amplitudes of the vibrations transmitted to the other end of the monolithic bar are monitored and plotted on a graph against the frequency of the vibrations.

It is found that such graph shows a series of amplitude peaks of different heights corresponding to various frequency zones. The highest amplitude peak occurs at what applicants call the base frequency ($f^*$) of the monolithic bar. This base frequency can be converted to a theoretical base frequency ($f_0$) which is the frequency at which the highest amplitude peak would occur for the laminated bar if it were vibrated in the same way, provided that no damping took place in the adhesive interlayer or interlayers of the laminate. This theoretical base frequency can be expressed by $$f_0 = f * \sqrt{\frac{e_v \cdot P_v}{e_i \cdot P_i + e_v \cdot P_v}}$$

where $e_v$ = the total thickness of the vitreous sheets of the laminated bar, and is equal to the thickness of the monolithic bar, $P_v$ = the density of the vitreous material, $e_i$ = the total thickness of the adhesive intervening layer(s) of the laminated bar, and $P_i$ = the density of such adhesive material.

After the test on the monolithic bar, the laminated bar is likewise supported at points lying 5 cm from each of its ends and one end is caused to vibrate at a variable frequency with substantially constant amplitude. The amplitudes of the vibrations transmitted to the other end of the laminated bar are monitored and plotted on a graph against the frequency of the vibrations. The highest amplitude peak on this graph occurs at what applicants call the measured base frequency ($f$) of the laminated bar. This measured base frequency ($f$) of the laminated bar can be compared to the theoretical base frequcey ($f_0$) obtained from the test on the monolithic bar described above.

SUMMARY OF THE INVENTION

It is an object of the present invention to provide a laminated glazing pane having at least one intervening layer of adhesive material which, when compared with a known intervening layer of the same thickness, provides significantly greater sound transmission loss particularly over the upper range of audible frequencies.

Accordingly, the resent invention resides in a laminated glazing pane composed of two or more sheets of vitreous material successive facing surfaces of which are bonded together via a respective intervening layer of adhesive material, with the measured value of the base frequency ($f$) of the laminated pane, when measured by the above-described test, lying in the range $0.70 f_0 \leq f \leq 0.97 f_0$.

The expression "vitreous material" includes not only glass, but also vitrocrystalline material, which is a material formed from glass by subjecting the glass to a thermal treatment so as to induce the formation of one or more crystalline phases therein.

The invention is applicable to transparent and translucent glazing panes, to colored glazing panes, and to panes composed of one or more vitreous sheets which have been subjected to a special treatment to confer some desired property thereon, for example, a tempering treatment to increase the strength of the sheet or sheets, or a coating treatment.

When comparing a glazing pane according to the present invention with another glazing pane of the type previously known but whose various component parts have similar dimensions, applicants have found that the present invention substantially improves the sound transmission loss through the pane in the upper audible frequency range, and this increase in sound transmission loss arises because of the significant and effective damping which takes place in the intervening layer or layers of a glazing pane according to the present invention.

The advantage afforded by the present invention is further demonstrated by the results of actual sound transmission loss measuring tests performed by applicants on a pane according to the invention constituted by two glass sheets of equal thickness bonded together via an intervening layer of adhesive material and by comparing these results with those achieved through a single glass sheet the thickness of which is equal to the total thickness of the vitreous sheets of the laminate.

Such tests were performed by the method described in "Field and laboratory measurements of airborne and impact sound transmission ISO R 140—1960 (F)" — International Organization for Standardization.

As has been noted before, the transmission loss and the critcal frequency of a single glass sheet are dependent on the thickness of the sheet. When this single glass sheet is replaced by a laminate according to the present invention and of equal total vitreous sheet thickness, the transmission loss in the lower range of frequencies remains unaltered, but the critical frequency of the laminate is displaced upwards, thus extending the range of frequencies over which a better transmission loss is obtained.

For example, for a single glass sheet 8 mm thick, the critical frequency occurs at 1600 Hz, and a substantial decrease in transmission loss takes place there. When replacing this single glass sheet by a laminate of two sheets each 4 mm thick, bonded together via an intervening layer of adhesive material according to the present invention, the critical frequency is shifted towards the range of 2,500 – 3,000 Hz, thus greatly extending the range of frequencies over which the transmission loss afforded by an 8 mm glass thickness occurs. Furthermore, in the upper range of frequencies the effects of the decrease of the transmission loss at the critical frequency of coincidence are less sensible to the ear. This dual advantage has not been present in previously known laminated panes. For conventional known laminated panes with a known interlayer of 0.76 mm thickness, the measured base frequency ($f$) has been found to be practically equal to $f_0$ and this points to the fact that only a small damping takes place in the known intervening layer(s), unless such layer(s) has or have considerable thickness.

The test devised by applicants is merely one way of comparing a laminated pane containing at least one such intervening layer with a monolithic sheet of the same total vitreous sheet thickness, and it should be noted that other tests on the same or a similar pane may well give different results. References hereafter to said measured base frequency or to the range thereof are to be taken to mean the base frequency of a pane, or the range thereof, when measured by applicants' test.

Preferably the laminated pane has a measured base frequency lying in the range $0.75 f_0 \leq f \leq 0.90 f_0$, since this has been found to be the optimum range.

Advantageously the, or at least one, such intervening layer includes a self-supporting sheet of plastic material, since this simplifies the manufacturing process. Embodiments of the invention wherein the, or at least one, intervening layer includes a plastic material to which has been added a plasticizer are especially preferred, since this feature allows the use of conventional plastic materials which, without the addition of such plasticizer, would not allow the pane to have the desired measured base frequency.

Preferably, the plasticizer is present in a proportion, by weight of such interlayer, between 30.5% and 35%, since such a proportion is very suitable.

Polyvinyl chloride, which inherently has viscoelastic properties which are good for the purposes presently in view, is a very suitable material for forming an interlayer.

When using adhesive material, under normal circumstances the sound transmission loss will be greater for thicker intervening layers, but applicants have found that the increase in transmission loss for a given increase in the thickness of such layer is particularly favorable for thin intervening layers, and that once a certain thickness of intervening layer has been reached, further increasing the thickness of such layer will add appreciably to the cost of the glazing panel without affording a commensurated increase in the sound insulating efficiency of the panel.

Preferably, therefore, the or at least one such intervening layer has a thickness of less than 1.0 mm. Layers having such a maximum thickness can afford very good sound transmission losses, and are considerably less expensive to incorporate in laminated panes than are thicker layers.

Preferably the thickness of the or at least one such intervening layer is less than or equal to 0.38 mm. Embodiments of the invention having this feature, while being slightly less efficient as sound insulating barriers than previously described embodiments of the invention, are none the less suitable for very many purposes and are markedly less expensive to produce than similar panels incorporating thicker intervening layers of adhesive material.

A laminated pane according to the invention may if desired include at least two vitreous sheets of different thicknesses, since this can have a beneficial effect on the way in which co-incidence phenomena affect the laminated pane. For example, the laminated pane may be composed of two vitreous sheets, one of which is at least twice as thick as the other.

The invention includes a multiple glazing panel composed of a first vitreous pane including a first vitreous sheet and, marginally held in spaced relation therewith, a second, laminated, pane as set forth above.

Multiple glazing panels form very effective sound insulation barriers.

Multiple glazing panels to which the invention relates may be formed by assembling two or more vitreous panes in spaced relation in a frame. Alternatively, or in addition, the panes may be held apart by means of intervening spacer strips glued or soldered to marginal face portions of the panes.

When comparing a first multiple glazing panel according to the present invention with a second multiple glazing panel of the type previously known but whose various component parts have similar dimensions, applicants have found that in the upper range of audible frequencies, the sound transmission loss across the panel is considerably improved by adopting the present invention, and this increase in sound transmission loss arises because of the significant and effective damping which takes place in the intervening layer or layers of a multiple glazing panel according to the present invention. The increase in transmission loss is particularly favorable at the higher audible frequencies.

Preferably, each vitreous sheet of the laminated pane is thinner than the first pane and, optimally, the total thickness of the laminated pane is less than that of the first pane.

Due to the presence of a laminated pane composed of sheets which are thinner than the first pane, the critical frequency of coincidence of the second laminated pane is higher than that of the first pane. Audible high pitched sounds are considerably deadened in the intervening layer or layers while the use of at least one thicker vitreous sheet, i.e. the first vitreous sheet, affords high transmission loss for low frequency sounds and, in order to enhance this effect, it is preferred that the coincidence transmission peaks of the respective panes do not significantly overlap, and the first pane should have a thickness at least 1.5 times that of the laminated pane.

It is preferred that each vitreous sheet of the laminated pane is at most half the thickness of the first pane, since this ensures a marked difference in the coincidence frequencies of the two panes.

Panels according to the invention whose first pane is at least 8 mm thick form very good transmission barriers, particularly as regards low frequency sounds.

Panels according to the invention whose laminated pane comprises vitreous sheets each of which is at most 4 mm thick are very effective as sound transmission barriers, especially as regards high audible frequencies.

Preferably, the first and second panes are not strongly dynamically coupled together, i.e. they are not so coupled that when one of them is caused to vibrate, for example, by the incidence of acoustic vibration, this results in a vibration of the other of such sheets at substantially the same frequency and amplitude. It is to be understood however that the term "substantially the same" is, insofar as the amplitude is concerned to be construed liberally and allow for tolerances up to 20%. To this end, it is preferred that the vitreous panes be held in spaced relation means of one or more spacer members glued to marginal portions of the panes. Gluing the two panes together via one or more spacer member in this way enables any sound vibration transmitted from one pane via such spacer member or members to the other pane to be damped by the glue layers.

A multiple glazing panel according to the invention is preferably mounted in a wall so that the first pane is nearer than the second pane to the source of sound vibrations, i.e. the first pane is nearer the exterior of the room or other space which it is desired to insulate acoustically. This arrangement is especially suitable for outside windows of buildings, since the first pane may then protect the second pane from mechanical shocks originating from outside the building.

DESCRIPTION OF THE PREFERRED EMBODIMENTS

Figure 1:
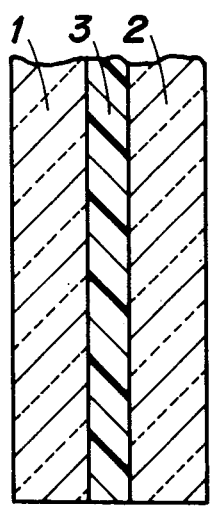
FIG. 1 is a cross-sectional view of one embodiment of a laminated glazing pane according to the invention.

FIG. 1 shows a glazing pane made up of two sheet 1 and 2 or ordinary soda-lime glass, each 4mm in thickness, bonded together by an intervening layer 3 of adhesive plastic material 0.76 mm thick.

EXAMPLE 1

A glazing pane as shown in FIG. 1 was made having an intervening adhesive layer 3 of polyvinylbutyral such as is currently used in making conventional laminated glazing panes. This pane was therfore not constructed in accordance with the present invention, and it was merely made for comparison purposes.

This pane was subjected to the test described earlier herein. The measured base frequency ($f$) for a bar cut from the pane was found to be about 670 Hz and practically equal to the theoretical base frequency ($f_0$), derived from the measured base frequency ($f^*$) of a monolothic bar (694Hz).

EXAMPLE 2

A glazing pane as shown in FIG. 1 was made having an intervening layer 3 of polyvinylbutyral to which had been added a quantity of the plasticizer, or plasticizing agent, "Flexol" (Trade Mark) made by Union Carbide. The "Flexol" was present in an amount totalling 33% by weight of the layer. A bar was cut from this pane and was subjected to the test set forth herein. The measured base frequency ($f$) for the bar was found to be about 595 Hz and thus it will be seen that $f = 0.89 f_0$.

The pane therefore conforms to the invention.

The glazing panes of Examples 1 and 2 were compared from the acoustic insulation point of view over the range of sounds of medium and high frequencies. It was found that the glazing pane of Example 2 i.e. the pane according to this invention, allowed, in comparision with the glazing pane of Example 1, a gain in mean sound transmission loss measured between 100 Hz and 3,200 Hz of 2.3 decibels, the acoustic insulation gain being obtained chiefly in the upper range of frequencies. The use of layers of polyvinylbutyral in which an adequate amount of plasticizing agent is incorporated is therefore advantageous.

EXAMPLE 3

A further laminated glazing pane was made to have the form shown in FIG. 1.

This further glazing pane was in accordance with the invention, and had a layer 3 of a copolymer of polyvinyl chloride containing 10 gr/kg of glycidylmethacrylate to which had been added a plasticizer in a proportion of 40 percent by weight of the other constituents. A suitable plasticizer for this addition is dioctylsebacate.

This pane was also subjected to the test set forth above.

The measured base frequency ($f$) for a bar cut from the glazing pane was found to be about 576 Hz, giving an approximate relationship of $f = 0.86 f_0$, since the theoretical base frequency was again about 670 Hz.

The glazing pane was also compared with that of Example 1 from the acoustic insulation point of view. A displacement of the critical frequency of coincidence towards the upper frequencies was observed, extending the range of frequencies over which the sound transmission loss of the panel was obtained. A gain in the mean sound transmission loss, measured between 100 Hz and 3,200 Hz of 2.4 decibels was observed.

EXAMPLE 4

A glazing pane can be constructed to have the form depicted in FIG. 1, except for the intervening layer 3 of plastic material which is 0.38 mm thick and of the composition given in Example 2.

Figure 2:
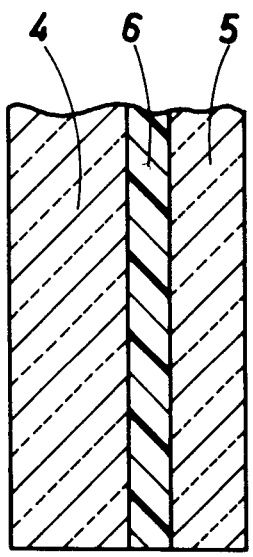
FIG. 2 is a cross-sectional view of a second embodiment of a laminated glazing pane according to the invention.

The test was performed on this pane (pane A) and the results were as follows:
$f^* = 694$ Hz
$f_0 = 687$ Hz
$f = 615$ Hz
$f = 0.895 f_0$ A second glazing pane (pane B) can be constructed to have the form shown in FIG. 2, to include two sheets 4 and 5 of ordinary soda-lime glass of respectively different thickness bonded together by an intervening layer 6 of adhesive plastic material 0.38 mm in thickness made of polyvinylbutyral and containing 34% of the plasticizing agent "Flexol" (Trade Mark) by weight of the layer.

Thicknesses of 5.5 and 2.5 mm, respectively, can be chosen for the glass sheets 4 and 5 so that the effectiveness of such pane can be compared directly with pane A above.

When such a pane B is subjected to the test, the following results are achieved:
$f^* = 694$ Hz
$f_0 = 687$ Hz
$f = 618$ Hz
$f = 0.90 f_0$.

Panes A and B of this Example can also be compared from the acoustic insulation point of view with the pane of Example 1 (a known laminated pane) and the pane of Example 2.

It is found that panes A and B of this Example give a gain in mean sound transmission loss over the pane of Example 1 which is similar to the gain afforded by the pane of Example 2, and that a slightly greater gain if afforded by the asymmetric pane of this Example (pane B) in the range of the critical frequencies of coincidence.

EXAMPLE 5

Figure 3:
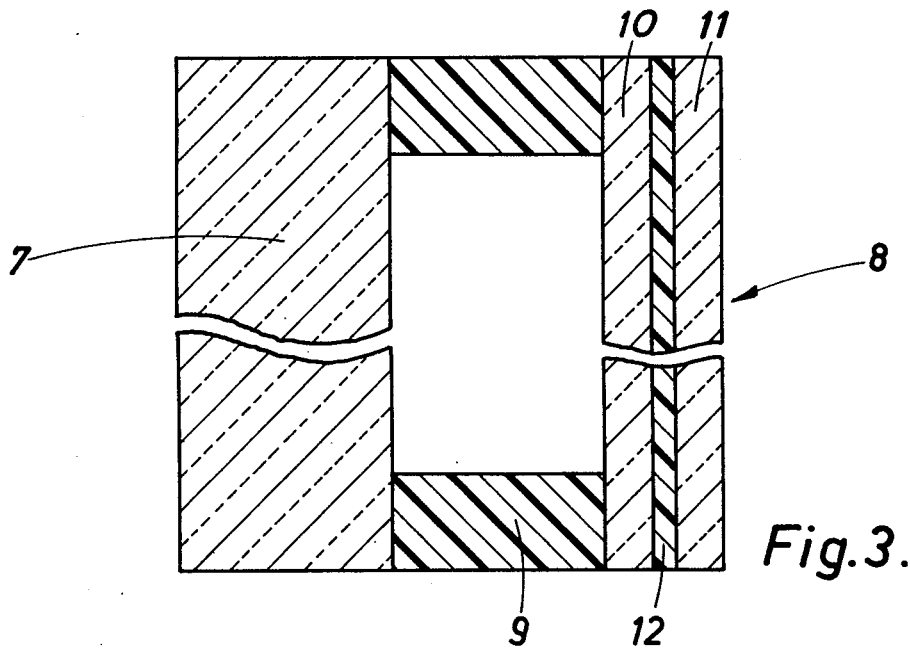
FIG. 3 is a cross-sectional view of one embodiment of a double glazing panel according to the invention.

The panel shown in FIG. 3 is a double glazing panel composed of two vitreous panes 7 and 8 marginally held in spaced relation by a spacer member 9. The first pane 7 is a single glass sheet 12 mm in thickness. The second pane 8 is a laminated pane composed of two glass sheets 10 and 11, each 4 mm in thickness, connected to one another by a layer 12 of an adhesive plastic material 0.76 mm in thickness. The air space between the two panes in 12 mm across.

A comparison was made between two double glazing panels. The first glazing panel was a panel as shown in FIG. 3 and whose layer 12 was of polyvinylbutyral and contained 33%, by weight of the layer, of the plasticizing agent "Flexol" (Trade Mark). The second glazing panel was a conventional double glazing panel formed by two single sheets, one 12 mm in thickness, the second 8 mm in thickness, again spaced apart by an air gap of 12 mm.

The test herein set forth was made on bars cut from the second pane of each of the two glazing panels and the measured base frequency ($f$) of the laminated bar was compared to its theoretical base frequency ($f_0$). The relation between $f$ and $f_0$ was found to be $f = 0.89$ $f_0$. The two double glazing panels were also compared from the acoustic insulation point of view over the range of sounds of medium and high frequencies. It was found that the double glazing panel according to the invention, in comparison with the other, conventional, double glazing panel, allowed a gain in the mean sound transmission loss, measured between 100 Hz and 3,200 Hz, of 3.3 decibels, the greater part of the acoustic insulation gain being obtained in the upper range of frequencies. The decrease in the sound transmission loss in the range of the coincidence frequencies had practically disappeared.

The use of a double glazing panel in which one pane is made up of a laminate composed of a layer of polyvinylbutyral in which an adequate amount of plasticizing agent is incorporated is therefore advantageous.

EXAMPLE 6

Figure 4:
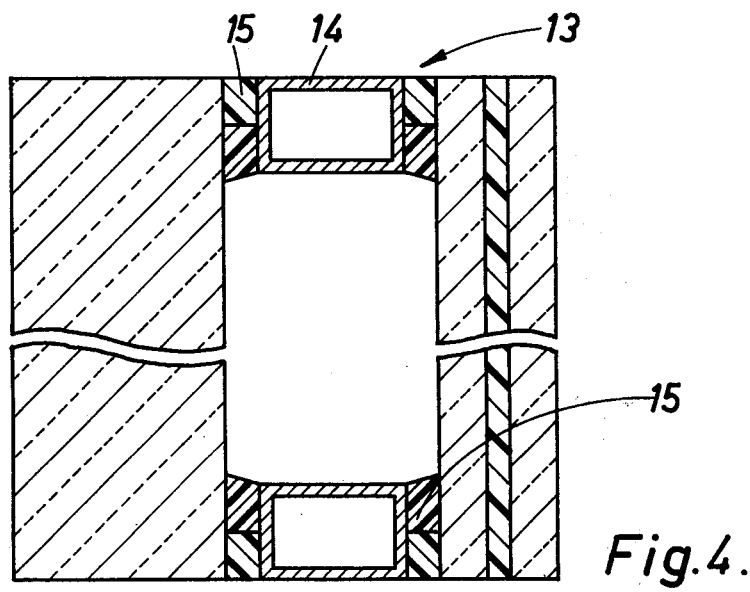
FIG. 4 is a cross-sectional view of a second embodiment of a double glazing panel according to the invention.

A double glazing panel was made in the form shown in FIG. 4, and was similar in all respects to that in Example 5 except that the spacing member spacing the two panes was a spacer element 13 glued to the marginal portions of the sheets. This spacer element 13 includes a hollow aluminum section member 14 glued by means of a double joint 15 of thiokol or silicone.

By performing the tests herein set forth, the ratio between $f$ and $f_0$ of the laminated pane was again found to be $f = 0.89\, f_0$.

The gain in the mean sound transmission loss was found to be higher than in Example 5 and about 4.3 decibels.

EXAMPLE 7

A double glazing panel having the form shown in FIG. 3 was made to include two vitreous panes 7 and 8 marginally held in spaced relation by a spacer member 9. The first pane 7 was a single glass sheet 12 mm in thickness, the second pane 8 was a laminated pane composed of two glass sheets 10 and 11 each 4 mm in thickness, connected to one another by an interlayer 12 of plastic material constituted by a copolymer of polyvinylchloride with a content of glycidylmethacrylate (10 g/kg), to which had been added dioctylsebacate in a proportion of 40% by weight of the other constituents of the layer.

By performing the test herein set forth, the ratio between $f$ and $f_0$ was found to be $f = 0.86\, f_0$.

The mean acoustic insulation obtained by using this double glazing panel is about 3.6 decibels more than that given by a similarly dimensioned previously known double glazing panel.

The above examples thus demonstrate that improved sound transmission attenuation can be provided by a laminated pane if it is manufactured in such a manner that its base frequency ($f$) bears a predetermined relationship to its theoretical base frequency.

It will be understood that the above description of the present invention is susceptible to various modifications, changes and adaptations, and the same are intended to be comprehended within the meaning and range of equivalents of the appended claims.

We claim:

1. In a laminated glazing pane comprising at least two sheets of vitreous material and an intervening layer of adhesive material bonding said sheets together, the improvement wherein said intervening layer is of a predetermined thickness and comprises polyvinyl chloride and an added plasticizer, said plasticizer being present in a proportion of 30.5% to 35%, by weight, of said intervening layer, for causing the numerical value of the base frequency ($f$) of said laminated pane to lie in the range $0.70 f_0 \leq f \leq 0.97 f_0$ where $f_0$ is the theoretical base frequency of the pane, whereby the pane has improved sound damping properties.

2. A pane as defined in claim 1 wherein the measured base frequency thereof lies in the range $0.75 f_0 \leq f \leq 0.90 f_0$.

3. A pane as defined in claim 1 wherein said intervening layer is a self-sustaining sheet.

4. A pane as defined in claim 1 wherein said intervening layer has a thickness of no greater than 1.0 mm.

5. A pane as defined in claim 9 wherein said intervening layer has a thickness of no greater than 0.38 mm.

6. A pane as defined in claim 1 wherein said two vitreous sheets bonded together by said layer are of respectively different thicknesses.

7. A multiple glazing panel comprising: a first vitreous pane composed of a first vitreous sheet; a laminated pane as defined in claim 1; and means attached to the margins of said panes and holding said panes in spaced relation to one another.

8. A panel as defined in claim 7 wherein each vitreous sheet of said laminated pane is thinner than said first pane.

9. A panel as defined in claim 8 wherein the total thickness of said laminated pane is less than that of said first pane.

10. A panel as defined in claim 9 wherein said first pane has a thickness at least 1.5 times the total thickness of said laminated pane.

11. A panel as defined in claim 8 wherein each vitreous sheet of said laminated pane has a thickness of no greater than one-half the thickness of said first pane.

12. A panel as defined in claim 8 wherein said first pane has a thickness of at least 8 mm.

13. A panel as defined in claim 12 wherein each of said vitreous sheets of said vitreous pane has a thickness of no greater than 4 mm.

14. A panel as defined in claim 7 wherein the space between said first pane and said laminated pane is no greater than 25 mm.

15. A panel as defined in claim 7 wherein said means establish a weak dynamic coupling between said first pane and said laminated pane.

16. A panel as defined in claim 15 wherein said means comprise at least one intervening spacer member glued to marginal portions of said panes.

17. A panel as defined in claim 1 consisting of only two said sheets of vitreous material and one said intervening layer.

18. A panel as defined in claim 17 wherein said intervening layer has a thickness of no greater than 1.0 mm.

19. A panel as defined in claim 17 wherein said intervening layer has a thickness of no greater than 0.38 mm.

* * * * *